United States Patent
Honken et al.

(10) Patent No.: US 7,453,911 B2
(45) Date of Patent: Nov. 18, 2008

(54) METHOD AND DEVICE FOR CONTROLLING STUFFING

(75) Inventors: Stefan Honken, München (DE); Ronalf Kramer, München (DE)

(73) Assignee: Infineon Technologies AG, Munich (DE)

( * ) Notice: Subject to any disclaimer, the term of this patent is extended or adjusted under 35 U.S.C. 154(b) by 995 days.

(21) Appl. No.: 10/618,302

(22) Filed: Jul. 11, 2003

(65) Prior Publication Data

US 2004/0008804 A1    Jan. 15, 2004

(30) Foreign Application Priority Data

Jul. 12, 2002   (DE)  ................ 102 31 648

(51) Int. Cl.
*H04J 3/07*   (2006.01)
(52) U.S. Cl. ..................... 370/505; 375/375
(58) Field of Classification Search .............. 375/260; 370/516
See application file for complete search history.

(56) References Cited

U.S. PATENT DOCUMENTS

| | | | | | |
|---|---|---|---|---|---|
| 4,392,220 | A | * | 7/1983 | Hirosaki et al. | ............. 370/479 |
| 5,337,315 | A | * | 8/1994 | Ehrlich | ................. 370/505 |
| 5,619,506 | A | * | 4/1997 | Burch et al. | ............... 370/506 |
| 5,638,379 | A | * | 6/1997 | Narasimha et al. | ......... 714/707 |
| 5,680,422 | A | * | 10/1997 | Burch et al. | ................ 375/371 |
| 5,708,684 | A | * | 1/1998 | Ueda | ..................... 375/358 |
| 6,229,863 | B1 | * | 5/2001 | Rude | ..................... 375/372 |
| 6,233,297 | B1 | * | 5/2001 | Itoh | ........................ 375/376 |
| 6,459,746 | B2 | * | 10/2002 | Agazzi et al. | ............... 375/371 |
| 6,463,111 | B1 | * | 10/2002 | Upp | ....................... 375/372 |
| 6,922,436 | B1 | * | 7/2005 | Porat et al. | ................. 375/222 |
| 7,020,074 | B1 | * | 3/2006 | Rickard et al. | ............. 370/210 |
| 2003/0142764 | A1 | * | 7/2003 | Keevill et al. | ............... 375/341 |

FOREIGN PATENT DOCUMENTS

| | | |
|---|---|---|
| DE | 4013317 A1 | 8/1990 |
| DE | 4101270 A1 | 7/1992 |
| DE | 4205959 A1 | 9/1993 |
| DE | 19515344 A1 | 8/1996 |

* cited by examiner

*Primary Examiner*—Frank Duong
(74) *Attorney, Agent, or Firm*—Peter F. Corless; Steven M. Jensen; Edwards Angell Palmer & Dodge LLP

(57) ABSTRACT

A method and device for controlling the phase of successively transmitted frames, in which data symbols are transmitted at a constant symbol frequency, in which a phase difference between the clock of the frame transmission and a data clock is determined and, dependent on the phase difference, an adjusting signal is produced for controlling the injection of stuffing data symbols into the frames for changing the frame length and the phase of the frame transmission, whereby the phase of the frame transmission is controlled so that the frames are transmitted on average synchronously with the data clock, wherein the adjusting signal is produced dependent on the phase difference determine from N frame in each successively transmitted, whereby N is at least 2.

17 Claims, 4 Drawing Sheets

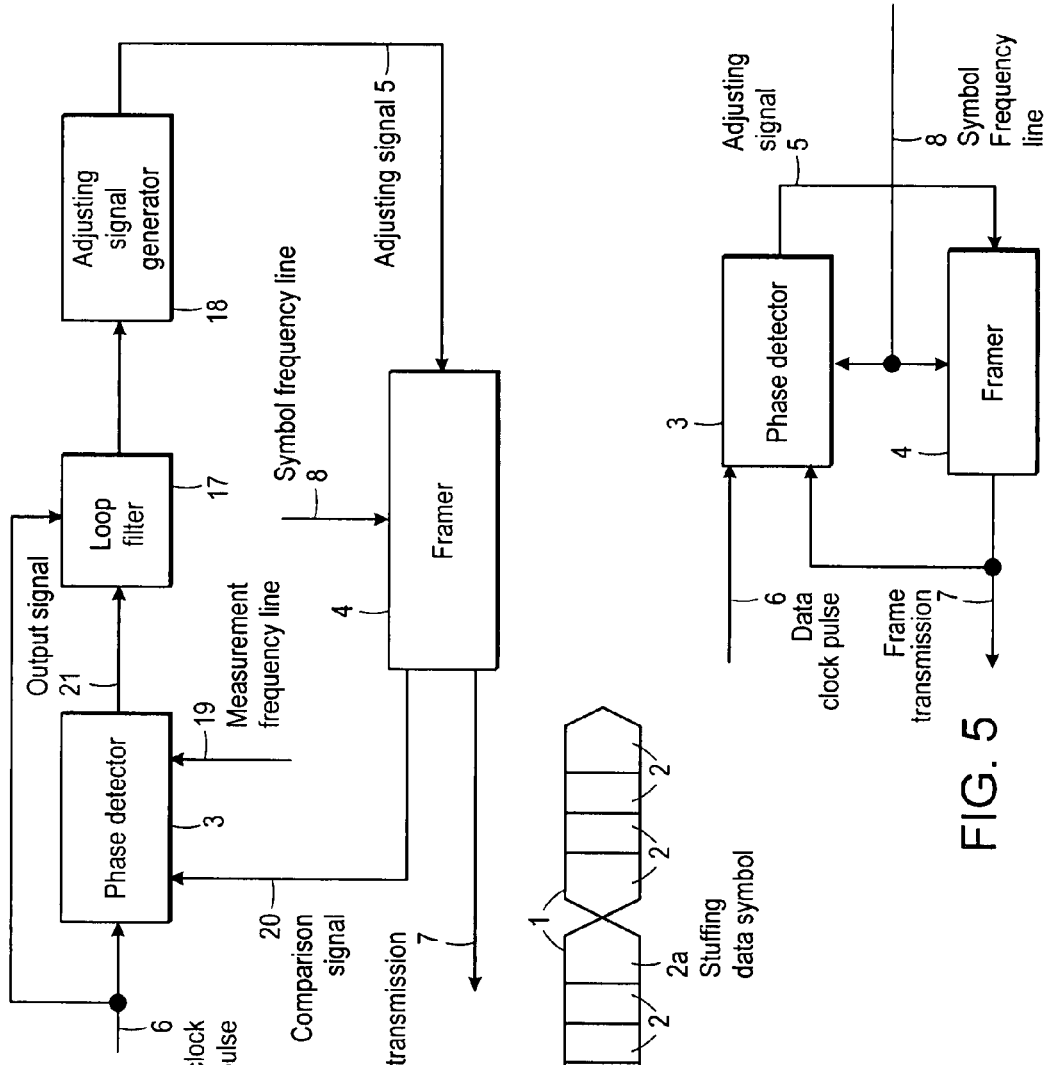

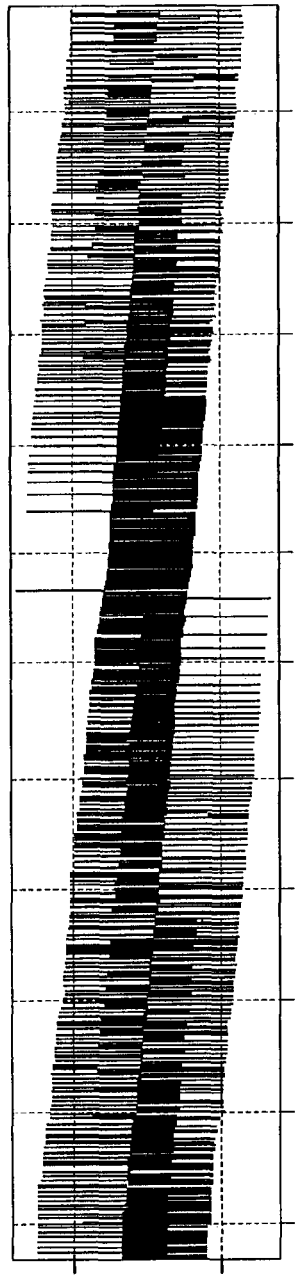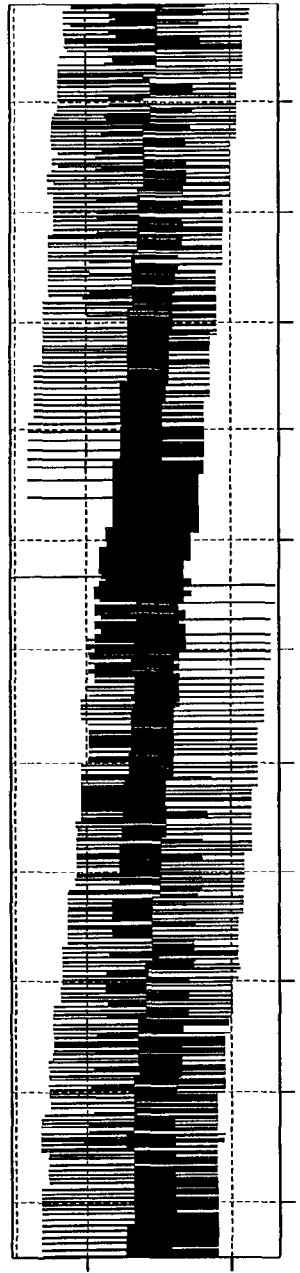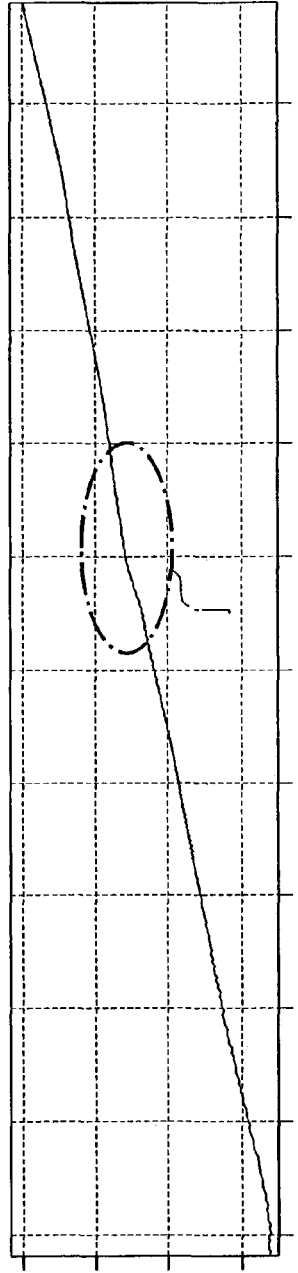

METHOD AND DEVICE FOR CONTROLLING STUFFING

FIELD OF THE INVENTION

The present invention relates to a method for controlling the phase of successively transmitted frames, in which data symbols are transmitted at a constant symbol frequency, whereby the clock phase of the frame transmission is changed by injecting stuffing data symbols into the frames. Furthermore the invention relates to a device or a phase detector, which is set up for executing the above method.

BACKGROUND OF THE INVENTION

With a plesiochronous communication method, in particular during S(H)DSL transmission, data symbols are combined and transmitted in frames, whereby the length of the frames is changed in relation to a reference length by injecting or omitting stuffing data symbols in such a way that the frame length or clock of the frame transmission averaged over several frames is synchronous with a data clock. The data symbols within the frames are therefore transmitted at a constant symbol frequency. In this way it is possible to transmit data symbols, which are provided for transmission in a data source clock, at the symbol frequency and on a receiving side to again insert these into the data source frequency. This is important in particular if a data source frequency, which is also variable under certain circumstances, is the case but data symbols nevertheless must still be transmitted at a constant symbol frequency, in order to achieve transmission tuned to the constant electrical characteristics in particular of a wire-bound transmission channel. The data clock is a measure for the frequency, at which the data symbols to be transmitted arise, or the data source frequency. Since several data symbols are transmitted in a frame, the frame frequency is necessarily substantially lower than the data source frequency. The data clock is therefore advantageously scaled, the data source frequency usually being divided by the number of data symbols and stuffing data elements normally transmitted in a frame, in order to obtain a signal corresponding to the frame transmission.

This injection or omission of stuffing data symbols within the frames is also known as stuffing. During an S(H)DSL transmission for example the standard length of a frame is 6 ms. Irrespective of the data symbols of fixed length waiting to be transmitted the length of the frames will be controlled by means of the stuffing data symbols in such a manner that this on average deviates slightly from the standard length.

The frames 1 shown in FIG. 4 have varying lengths, which have been produced by injected stuffing data symbols, whereby the data symbols 2 have been expanded by the stuffing data symbols 2a and for example the frame 1 shown on the right has four data symbols 2 and the frame 1 shown on the left next to it has four data symbols 2 and a stuffing data symbol 2a and therefore in total five data symbols or stuffing data symbols. FIG. 4 shows the structure of frames 1, which are transmitted one after the other and in each case exhibit data symbols 2. A known device for controlling the frame length is shown in FIG. 5. The device comprises a phase detector 3, to which on the input side a data clock pulse 6 and the signal of the frame transmission 7 are sent. The phase detector 3 dependent on the phase difference between the two input signals produces an adjusting signal 5, with which a frame generator 4 is controlled. The frame generator 4 receives a data source frequency via a signal with the data symbols to be transmitted, not illustrated, and is set up in such a manner that it emits these data symbols in the clock of a symbol frequency, which is supplied via a symbol frequency line 8 and within a frame, the length of which is adjusted by the signal 5. The phase detector 3 is also connected to the symbol frequency line 8 and thereby receives the symbol frequency. The phase detector 3 is set up in such a manner that to determine the phase difference between the two input signals it computes in which periods of the symbol frequency an edge of the data clock pulse 6 or the beginning of a new frame within the frame transmission signal 7 falls and by comparing the duration of the periods concerned of the symbol frequency signal determines the phase difference. The frame transmission signal 7 is transmitted wire-bound to a receiver, which by means of a known clock and data recovery device, extracts from the frame transmission signal 7 both the data symbols and the symbol frequency. A device is shown in FIG. 6, with which the data source frequency is recovered on the receiving side dependent on the symbol frequency, that is transmitted via a symbol frequency line 8, and the frame transmission signal 7 or the frame transmission 7. For this purpose the device has a deframer 9, which analyzes the data symbols in the frame transmission signal 7, extracts the frame structure and sends a signal synchronous with the frame to a PLL circuit. The PLL circuit consists of a phase detector 10, the output signal of which is filtered through a loop filter 11 with a proportional and an integral section and fed to a controlled oscillator 12. The output signal of the oscillator 12 is divided by a divisor 13 and fed back to an input of the phase detector 10. The factor of the divisor 13 is arranged so that the output signal of the oscillator 12 corresponds to the data source frequency. The data symbols contained in the frame transmission signal 7 are passed to the receiving side at the data source frequency.

If on the sending side the data source frequency is exactly synchronous to the symbol frequency or to the symbol frequency adapted to the amount of data symbols transmitted in a frame 1, stuffing data symbols are injected or omitted alternating into the frames 1. Therefore the structure with alternating lengths for the frames 1, shown in FIG. 4, results for the frames 1. The average frame length corresponds in this case exactly to the standard length of the frame length, for example 6 ms with S(H)DSL. If the data clock however is not exactly synchronous to the symbol frequency or the divided symbol frequency, the frame length is not always alternating, but after a certain amount of frames stuffing data symbols are injected or omitted several times one after the other, in order to compensate the slight deviation or to adjust the average frame length to the data clock.

In FIG. 7 such a case is shown, whereby the progression 14 corresponds to the phase of the frame transmission signal 7 and the progression 15 to the phase of the data clock on the data clock line 6. The phase of the frame transmission corresponds thereby to the time situation of the changes between the frames. From this progression it can be seen that the phase 14 of the frame transmission 7 as a result of the alternating injection or omission of a stuffing data symbol constantly jumps to and fro, but on average remains constant for a certain number of frames. However as soon as the difference between the phase 15 and the data clock 6 and the average phase of the phase progression 14 becomes too great, a stuffing data symbol is injected twice one after the other into a frame 1, whereupon again the strictly alternating injection or omission of the stuffing data symbol begins. In the case illustrated after 13 standard cycles with alternating stuffing every time, stuffing data symbols are injected twice after each other, so that a step-like structure of the zigzag progression 14 results.

In FIG. 7 the phase of the data clock 6 generated on the receiving side by the PLL circuit is shown under the progression 14 with the progression 16. An interruption of the alternating stuffing on the sending side by injecting or omitting stuffing data symbols several times one after the other leads on the receiving side in the phase of the recovered data clock to timing jitter, which is all the more difficult to suppress the greater the time interval between them. The reason for this is that with a long time interval the frequency, at which jitter arises, decreases and can be suppressed with all the more difficulty by the PLL on the receiving side. This means that the disadvantageous jitter on the receiving side is all the more pronounced, the greater the number of frames, with which strictly alternating stuffing data are injected and omitted or the lesser the deviation of the data source frequency from the symbol frequency or the adapted symbol frequency.

SUMMARY OF THE INVENTION

The objective of the present invention is therefore to create a method or a phase detector set up to execute the method, as well as a device set up to execute the method, whereby the phase of frames transmitted one after the other, in which data symbols are transmitted at a constant symbol frequency, is controlled by injecting or omitting stuffing data symbols into the frames in such a manner that the average frame length is synchronous with a data source frequency and when the data clock is recovered from the transmitted frame on a receiving side, no or only very little jitter arises in the phase of the recovered data clock.

This objective according to the invention is achieved by a method with the features of claim 1 or a phase detector with the features of claim 12 as well as a device with the features of claim 14. The sub-claims in each case define preferred and advantageous embodiments of the present invention.

According to the invention the phase difference between the clock of the frame transmission and the data clock is determined over the phase of in each case at least two successive frames. In particular the phase difference over at least two frames can be averaged. In this way with transient control (PLL) that is to say the operating movement, in which alternating stuffing data symbols are injected and omitted, is removed and the difference between the averaged phase of the frame transmission and the data clock can be determined more accurately and therefore the average phase of the frame transmission can be better adjusted to the phase of the data clock. This means that the strictly alternating stuffing or injection and omission of a constant number of stuffing data symbols can be interrupted even after a short time, for example by repeated successive injection or omission of stuffing data symbols in order to adjust the average phase of the frame transmission to the phase of the data clock, so that on the receiving side deviations from the strictly alternating stuffing occur in shorter succession, therefore can be better compensated by the PLL and jitter can be more easily suppressed.

Advantageously in regard to the control system both a proportional section and an integral section are proposed in the specifications to compute the adjusting signal, so that in particular no lasting deviation from the standard arises. The control system is time discrete just like the control system mentioned in FIG. 5 as prior art.

Particularly advantageously the control system is set up in such a manner that two limit cycles arise, which correspond to two different adjusting signal movements. The two limit cycles comprise a small limit cycle, by which stuffing data symbols are injected in two alternating amounts into the frames and the adjusting signal movement which has a higher frequency than the adjusting signal movement of a large limit cycle. The small limit cycle therefore corresponds to the strictly alternating stuffing. The parameters of the control system, that is to say the method of amplitude discretisation of the signals within the control system (quantization) and the discrete values of the factors for the proportional and the integral section, are adjusted for this purpose in such a way that this additional large limit cycle arises and additionally to the strictly alternating stuffing a further operating movement of the adjusting signal arises, however at a lower frequency. The frequency of this operating movement or the adjusting signal movement in the large limit cycle however is higher than the frequency, at which interruptions in the strictly alternating stuffing would arise in the case of control systems according to prior art, so that on the receiving side better suppression of jitter in the phase of the recovered data clock is possible, since the jitter frequency is higher and in particular higher than the natural frequency of the PLL on the receiving side.

The adjusting signal can assume different conditions, which correspond in each case to a certain number of injected stuffing data symbols. In the simplest embodiment the adjusting signal can only assume two different conditions, so that to influence the length of the frames only two different amounts of stuffing data symbols can be injected. This for example may be injection of such a symbol or omission of this one symbol. Likewise however more than one such symbol can be injected or omitted. Beyond this however it is also conceivable that more than two conditions for the adjusting signal are provided, so that successively the amount of injected stuffing data symbols can be influenced more precisely or more than two different amounts of injected stuffing data symbols are possible.

In regard to determining the phase difference for the N frames transmitted in each case the phase difference for successive frames can be determined and the determined phase differences for example can then be averaged. Generally N advantageously is even-numbered, so that the fluctuations in the phase of the frame transmission are eliminated owing to strictly alternating stuffing.

To determine the phase of the data clock or the frame transmission or to determine the phase difference between these two signals a phase measurement frequency can be used, which is higher than the frequency of the data clock or the frame transmission. In this case it is determined in which periods of the signal with the phase measurement frequency edges of the data clock or the frame beginnings during the frame transmission fall and the phase difference is computed by comparing these determined periods. For this purpose in particular the number of periods of the signal with the phase measurement frequency which lie between the periods of this signal, in which the edges of the data clock or the frame beginnings of the frame transmission fall can be determined. Therefore the phase difference can be determined digitally with little effort. The resolution when determining the phase difference is therefore proportional to the phase measurement frequency. If the phase measurement frequency is increased, the phase difference can be resolved more accurately, since the time intervals become shorter, by which the difference between the occurrence of edges in the data clock and of frame beginnings during the frame transmission can be determined.

The essential importance with regard to the present invention relates to harmonizing all parameters within the control system. The control system must be set up in such a way that in addition to the alternating stuffing a somewhat lower frequency extra operating movement of the control system results, in order to keep to a minimum the periods in which only strict alternating stuffing arises. With the present invention the adjusting signal executes two overlying operating movements. One corresponds to the strictly alternating stuffing and the other to the large limit cycle caused by the controller parameters. The large limit cycle represents an operating movement at a frequency, which is less than that of the strictly alternating stuffing.

If the phase difference is determined by means of a signal with a phase measurement frequency as described above, the numerical range of the quantized phase difference depends on the phase measurement frequency used. The phase measurement frequency therefore directly influences production of the adjusting signal, so that the phase measurement frequency must also be considered when setting up the control system or when dimensioning the controller parameters. On the other hand however it is also possible to achieve the desired behaviour of the control system by changing the phase measurement frequency. The phase measurement frequency for example can amount to four times the symbol frequency.

Due to the long duration of the frames a digitally configured control system with all its functions of an electronic programmable digital counter, for example a microprocessor can be implemented. All parameters of the control system are stored here in an appropriate program, the execution of which by the microprocessor—possibly as one of several functions of the microprocessor—implements the control.

However the present invention can also be realized by an appropriate circuit,

Both the circuit and the microprocessor can also be part of an integrated circuit.

BRIEF DESCRIPTION OF THE DRAWINGS

The present invention is described in detail below on the basis of a preferential embodiment with reference to the attached drawings.

FIG. 1 shows a block diagram of a device for transmitting data symbols at a constant symbol frequency in frames and for controlling the average frame duration synchronously with a data clock in accordance with the embodiment of the present invention, FIG. 3 shows the exemplary progression of the phase of the frame transmission on the sending side and the receiving in side, as well as the progression of the phase of the data clock recovered on the receiving side, FIG. 4 shows the structure of the frames with injected data symbols, FIG. 5 shows the diagram of a known device for transmitting data symbols in frames with control of the frame duration synchronously with a data clock according to prior art.

DETAILED DESCRIPTION OF THE INVENTION

Figure 2A:
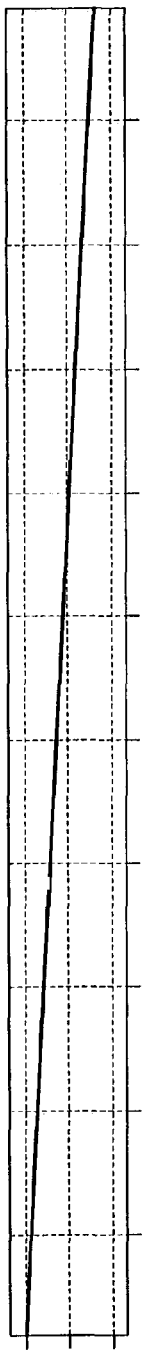
FIG. 2 shows exemplary progressions of various signals arising in the device in accordance with FIG. 1.

In FIG. 1 a device is shown for executing the method according to the invention. The device illustrated comprises a phase detector 3, which determines the phase difference between a data clock pulse 6 and a comparison signal 20 and dependent on this produces an output signal 21. The output signal 21 represents the computed phase difference and is fed to a loop filter 17, that has a proportional and an integral section and the output signal of which is fed to an adjusting signal generator 18, which on the output side produces an adjusting signal 5. The adjusting signal 5 is sent to a framer 4, which combines data symbols fed via a line, not illustrated, to frames and dependent on the adjusting signal 5 injects stuffing data symbols into the individual frames, in order to change the time duration of the frames. For this purpose the symbol frequency is supplied to the framer 4 via a symbol frequency line 8. The framer 4 on the output side produces a frame transmission signal 7 which is also called "frame transmission" below. Parallel with the frame transmission 7 the framer 4 produces the comparison signal 20, that serves as input signal for the phase detector 3. Both the phase detector 3 and the loop filter 17 receive the data clock pulse 6.

To determine the phase difference the phase detector 3 also receives a signal with a phase measurement frequency via a measurement frequency line 19. The phase measurement frequency is an integral multiple and in particular the quadruple of the symbol frequency, which is supplied via the symbol frequency line 8 to the framer 4 and with which the data symbols are transmitted.

In the embodiment described the standard frame length is 6 ms. For each frame 864 data symbols are transmitted and dependent on the adjusting signal 5, which can assume two conditions, two stuffing data symbols are injected or omitted. The phase measurement frequency is the quadruple of the symbol frequency.

If the phase difference is averaged in each case over two frames 1 one after the other, the following rules of calculation are suitable for the control signals, whereby the function "floor" signifies rounding off to the next integral value below:

$pd(i)$=floor (phase of data clock $(i)$−0.5×phase of the frame transmission $(i-1)$+phase of the frame transmission $(i-2)$)×4×864)

Input signal of the adjusting signal generator 18=floor $(pd(i) \times 2exp(-6)+intg(i) \times 2exp(-14))$, where $intg(i)=intg(i\ 1)+pd(i)$ The device shown in FIG. 1 represents a PLL circuit, in which by means of the adjusting signal 5 the time duration of the frames 1, which are produced by the framer 4, are controlled on average in such a way that the frames 1 of the frame transmission 7 lie synchronously with the clock of the data clock pulse 6.

The phase detector 3 is set up in this case so that its output signal 21 corresponds to the phase difference between the phase of the frames of the frame transmission 7 and the data clock pulse 6 determined in each case via several and in particular two successive frames 1. The adjusting signal generator 18 is set up in such a way that the adjusting signal 5 produced by it can assume several and in particular two conditions, whereby the adjusting signal generator 18 compares the signal passed to it by the loop filter 17 with a threshold value, which is in particular 0, and dependent on this produces the adjusting signal 5. In this case the adjusting signal generator 18 is set up in such a way that the adjusting signal 5 assumes a first condition, if the input signal of the adjusting signal generator 18 lies below the threshold value and the adjusting signal 5 assumes a second condition, if the input signal lies above the threshold value. If the input signal of the adjusting signal generator 18 is equal to the threshold value, the adjusting signal 5 assumes a different condition to the preceding condition. Dependent on the condition of the adjusting signal 5 the framer injects or otherwise a stuffing data symbol 2a into the frames 1 or a certain amount of stuffing data symbols 2a.

Figure 2B:
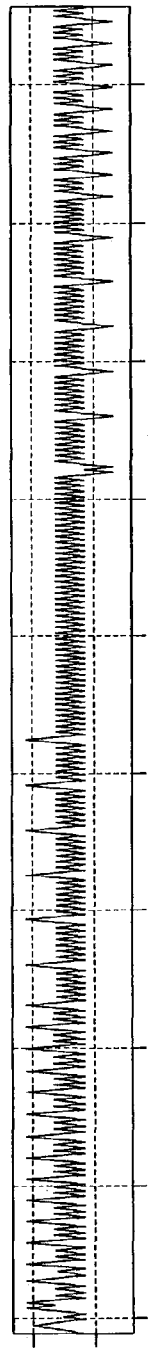
Figure 2C:
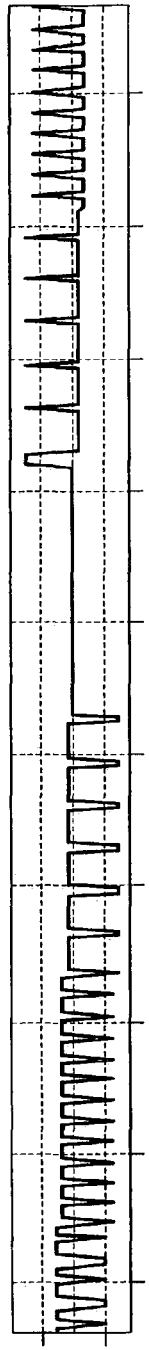
Figure 2D:
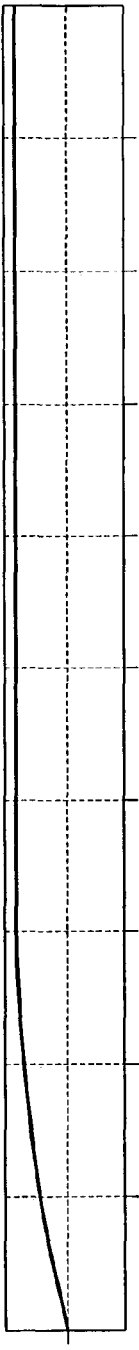
Figure 2E:
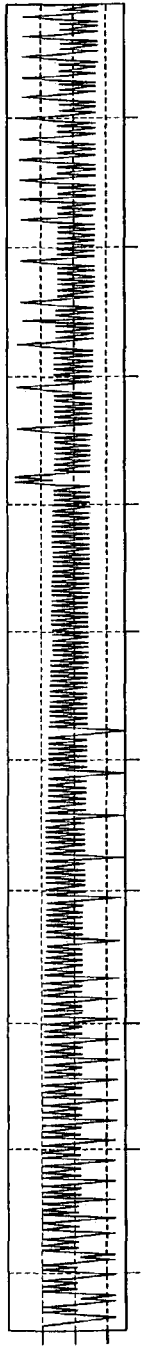
Figure 6:
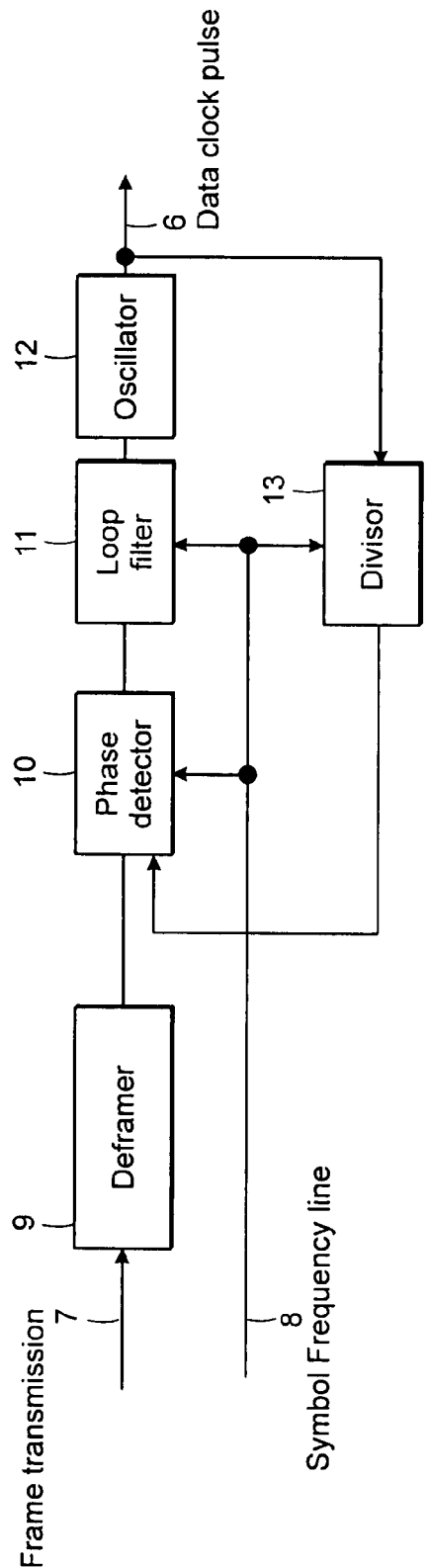
FIG. 6 shows the block diagram of a device for recovering the data rate on the receiving side according to prior art.
Figure 7:
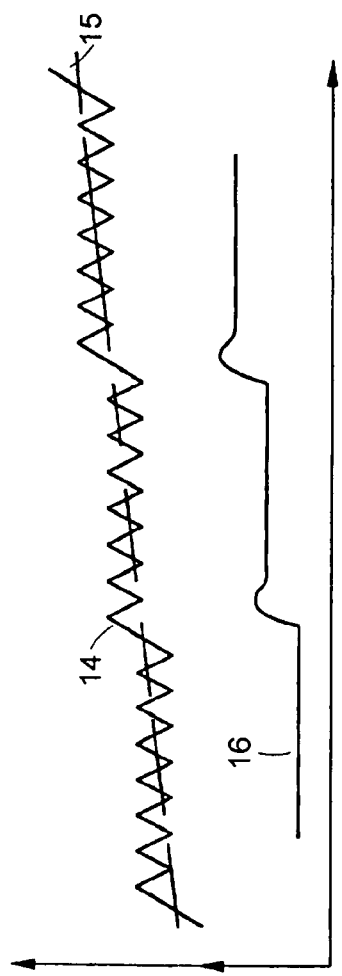
FIG. 7 shows the time progressions of the phase of the transmitted frames as well as the data clock recovered on the receiving side using the device in accordance with FIG. 5.

In FIG. 2 various signals propagating in the device in accordance with FIG. 1, are illustrated with their time progression for a real operational case. With the real case described here a very slight frequency deviation between the symbol frequency and the frequency of the data clock scaled to the symbol frequency is assumed. The data frequency is an integral part of the data source frequency. The basis of this scaling is the amount of data symbols 2 and stuffing data symbols 2a transmitted within a frame.

Progression a) from FIG. 2 shows the phase of the scaled data clock pulse 6 related to the symbol frequency. In this case it is to be noted that the scaled data clock frequency is somewhat lower than the symbol frequency, so that the phase decreases continuously. Diagram b) below shows the phase of the frames during the frame transmission 7, whereby this phase information is supplied to the phase detector 3 by means of the comparison signal 20. The phase progression of the frames shown in diagram b) essentially on average corresponds to the phase progression of the data clock progression 6 shown in diagram a), as it is expected from the control system. In this case it can be stated that the phase of the frames constantly jumps to and fro as a result of alternating stuffing, whereby the phases of strictly alternating stuffing are only of short duration and greater phase changes occur again and again.

In the present case the control system is set up in such a manner that it has a proportional section and an integral section. The proportional section is shown in diagram c). The integral section is shown in diagram d), whereby the proportional section and the integral section are multiplied by a proportional factor or an integral factor and then added, in order to form the signal passed to the adjusting signal generator 18.

Finally the progression of the difference between the frame transmission signal 7 and the data clock signal 6 achieved by means of the control system according to the invention is shown in diagram e. Although the progression illustrated has strong excursions, on average it always essentially moves around the zero-line. It is to be emphasized that only short sections with strictly alternating phase differences arise.

Diagram f) in FIG. 3 shows the phase difference as well as the relative frequency deviation illustrated in diagram g) between the data clock frequency and the PLL on the sending side, whereby a band longer in duration than in FIG. 2 is shown. Furthermore diagram h in FIG. 3 shows the progression of the phase of the recovered data clock on the receiving side.

Diagram f) in FIG. 3 also shows the large excursions, compared with prior art, of the phase difference, which occur due to the two limit cycles. On average however the relative phase difference is essentially 0. A small band of strictly alternating stuffing can be seen approximately in the centre of diagram f) related to the horizontal elongation.

In diagram g) shown below the associated relative frequency deviation, which from a qualitative aspect exhibits the same progression as the relative phase difference in diagram f) is illustrated.

The lowest diagram h) shows the progression of the phase of the recovered data clock on the receiving side. This time the data clock frequency in the transmitter is somewhat greater than the scaled symbol frequency in this case, so that the phase increases continuously. In this case the notch j marks a band in this progression, in which clock wander or small jitter arises. Here a natural frequency of the PLL on the receiving side is assumed, which is substantially lower than the frame frequency. With S(H)DSL frames nominally 6 ms in length this natural frequency lies for example at 1 Hz. The clock wander of the output phase of the PLL on the receiving side illustrated here in the real example is less than 180 ns and therefore lies below the permissible value of 725 ns for the S(H)DSL transmission with the lowest bit rate, in which 864 bits per frame are transmitted as standard. Here dependent on the condition of the adjusting signal 5 two stuff bits per frame are injected or omitted.

The clock wander shown in diagram h) arises through the single longer phase of strictly alternating stuffing, which can be clearly seen in the two diagrams f) and g) shown above.

The invention claimed is:

1. Method for controlling a phase of successively transmitted frames, in which data symbols are transmitted at a constant symbol frequency, comprising the steps of:
   determining a phase difference between a clock of a frame transmission and a data clock corresponding to the frequency at which the data symbols are transmitted;
   producing an adjusting signal based on the determined phase difference in order to control an injection of stuffing data symbols into the frames for changing frame length and the phase of the frame transmission, whereby the phase of the frame transmission is controlled so that the frames are transmitted on average synchronously with the data clock,
   wherein the adjusting signal is produced dependent on the phase difference determined from N frames in each case successively transmitted, whereby N is at least equal to 2.

2. Method according to claim 1, wherein the controlling, according to which the adjusting signal is produced, has a proportional section and an integral section.

3. Method according to claim 1, wherein the controlling of the adjusting signal has a large limit cycle.

4. Method according to claim 1, wherein the controlling of the adjusting signal is set up in such a manner that it has a large limit cycle and a small limit cycle, the adjusting signal movement of which has a higher frequency than the adjusting signal movement of the large limit cycle and during which stuffing data symbols are injected in two alternating amounts into the frames.

5. Method according to claim 1, wherein the adjusting signal can assume several different conditions, whereby the different conditions designate different amounts of injected stuffing data symbols.

6. Method according to claim 1, wherein the adjusting signal is produced dependent on the phase difference averaged in each case over N frames successively transmitted.

7. Method according to claim 1, wherein the controlling of the adjusting signal is time- and amplitude-discrete.

8. Method according to claim 1, wherein for determining the phase of the transmitted frames and the data clock or for determining the phase difference thereof it is recorded in which periods of a signal with a phase measurement frequency an edge of the data clock or the beginning of a new frame arises.

9. Method according to claim 8, wherein the phase measurement frequency is an integral multiple of the symbol frequency.

10. Method according to claim 1, wherein N is equal to 2.

11. Phase detector for use in a device for controlling a phase of successively transmitted frames, in which data symbols are transmitted at a constant symbol frequency, comprising:
   the phase detector is configured to determine a phase difference between a clock of a frame transmission and a data clock corresponding to the frequency at which the data symbols are transmitted, and produce an output signal, the output signal being dependent on the phase difference determined from N frames in each case successively transmitted, whereby N is at least equal to 2, and a controlling device configured to produce an adjusting signal based on the output signal of the phase detector in order to control an injection of stuffing data symbols into the frames for changing frame length and the phase of the frame transmission and controls the phase of the frame transmission so that the frames on average are transmitted synchronously with the data clock.

12. Device for controlling a phase of successively transmitted frames in which data symbols are transmitted at a constant symbol frequency, comprising:

a phase detector for determining a phase difference between a clock of a frame transmission and a data clock corresponding to the frequency at which the data symbols are transmitted; and an adjusting signal generating device, which is connected to the phase detector, and configured to produce an adjusting signal based on the determined phase difference in order to control an injection of stuffing data symbols into the frames for changing the frame length and the phase of the frame transmission, whereby the device is configured to control the phase of the frame transmission so that the frames on average are transmitted synchronously with the data clock, and whereby the device is set up in such a manner that it produces the adjusting signal dependent on the phase difference determined from N frames in each case successively transmitted, whereby N is at least equal to 2.

13. Device according to claim 12, wherein the adjusting signal generating device has a controller block with a proportional section and an integral section.

14. Device according to claim 12, wherein the adjusting signal generating device has a threshold switch, which is set up in such a manner that it supervises an input signal received by it in relation to over or under-stepping at least one limit value and dependent on this produces the adjusting signal.

15. Device according to claim 12, wherein the device is integrated in a semiconductor module.

16. Device according to claim 12, wherein the signals are processed digitally in the device.

17. Device according to claim 12, wherein the signals are processed in the device by execution of a program in a microprocessor.

* * * * *